July 30, 1963   R. A. WEIGEL ET AL   3,099,326
POWERED VEHICLE
Filed July 11, 1961   2 Sheets-Sheet 1
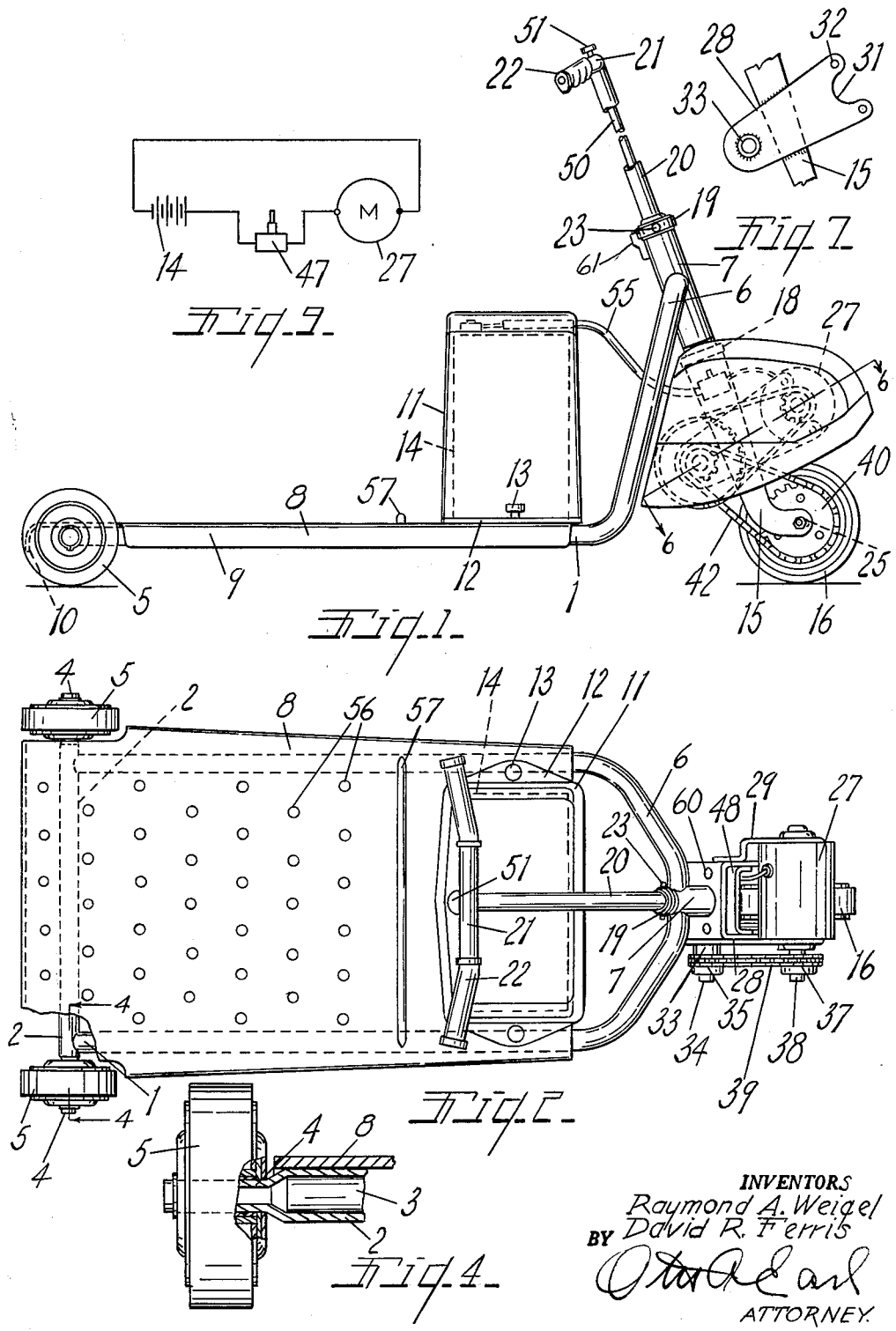
INVENTORS
Raymond A. Weigel
BY David R. Ferris
ATTORNEY

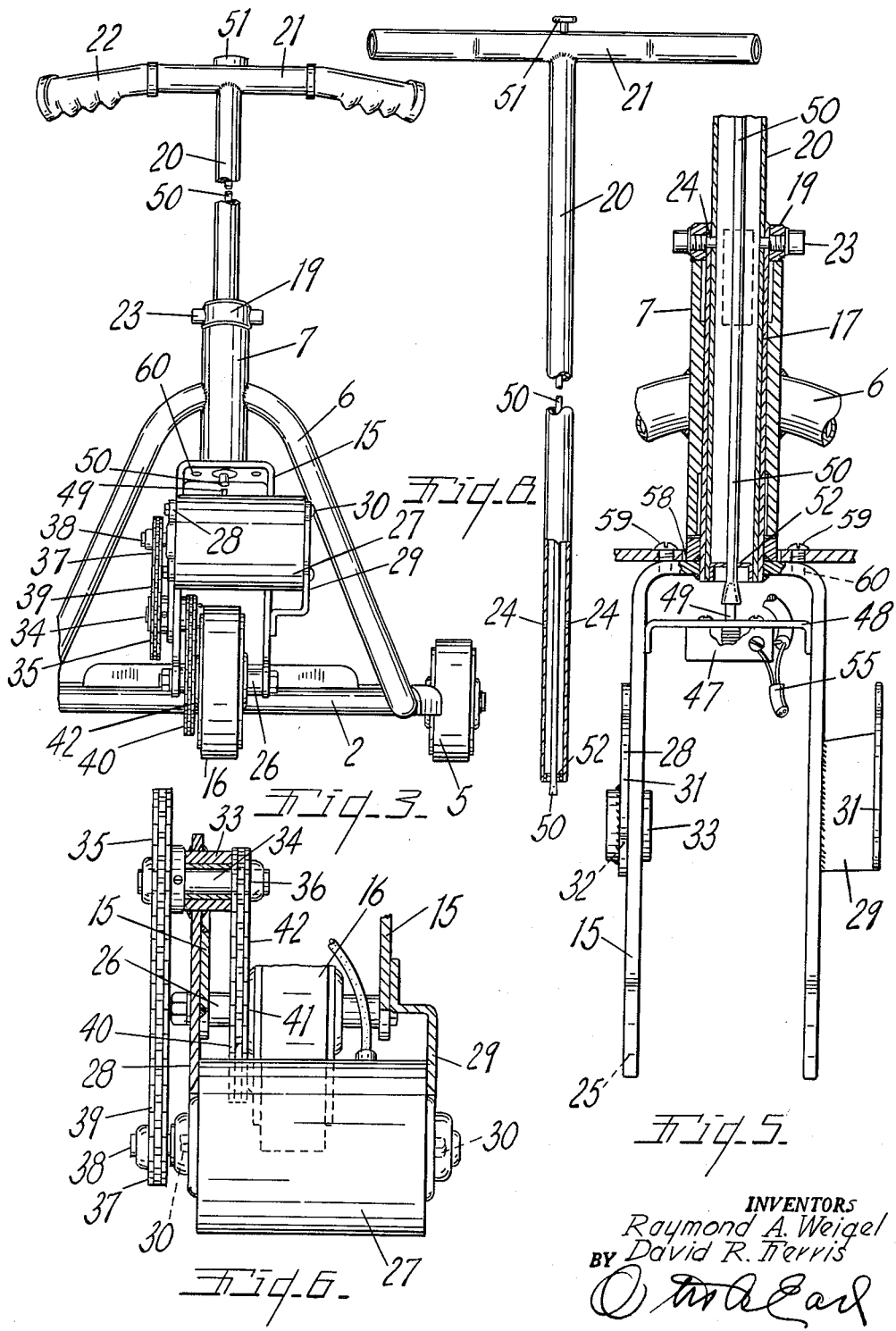

3,099,326
POWERED VEHICLE
Raymond A. Weigel and David R. Ferris, Cadillac, Mich., assignors to Kysor Heater Company, Cadillac, Mich.
Filed July 11, 1961, Ser. No. 123,170
10 Claims. (Cl. 180—26)

This invention relates to improvements in motor vehicles. The principal objects of this invention are:

First, to provide a motor vehicle which is well adapted for conveying an operator thereof in offices, factories, storehouses and the like.

Second, to provide such a vehicle which is very compact and easily operated and which includes relatively few parts.

Third, to provide a motor vehicle adapted for the uses above indicated which is light in weight and very easily handled and manipulated.

Objects relating to details and economies of the invention will appear from the description to follow. The invention is defined and pointed out in the claims.

A preferred embodiment of the invention is illustrated in the accompanying drawing, in which:

FIG. 1 is a fragmentary side elevational view of a motor vehicle embodying our invention, certain parts being shown in conventional form.

FIG. 2 is a fragmentary plan view with the hood or housing for certain gearing parts omitted.

FIG. 3 is a fragmentary front elevational view with the gearing housing omitted.

FIG. 4 is an enlarged fragmentary view on a line corresponding to line 4—4 of FIG. 2.

FIG. 5 is an enlarged fragmentary view partially in vertical section.

FIG. 6 is an enlarged fragmentary view partially in section on a line corresponding to line 6—6 of FIG. 1 illustrating details of the motor mounting and driving connections from the motor to the driving wheel.

FIG. 7 is a fragmentary side elevational view, certain details of one of the motor brackets and driving connection supports being illustrated.

FIG. 8 is a fragmentary view of the steering shaft and the motor switch control rod.

FIG. 9 is a diagrammatic view of the electrical connections for the battery to the motor and the relationship of the control switch thereto.

The embodiment of our invention illustrated is especially designed for use in transporting people in factories, storehouses and the like. This embodiment comprises a body frame including side bars 1 preferably of tubular stock, the rear ends of which are fixedly secured to the cross bar 2 which in the embodiment illustrated is formed of tubing and has a reinforcing rod 3 therein. The ends of this cross bar 2 are conformed to provide spindles 4 for the rear wheels 5. At their front ends the side bars 1 have upwardly and forwardly projecting converging arms 6 which are fixedly connected to the rearwardly inclined tubular bearing 7 which, in the embodiment illustrated, projects upwardly and downwardly relative to the ends of the arms 6.

The platform 8 is fixedly secured to the frame desirably by welding, the securing means not being illustrated as they may be varied. In the embodiment illustrated this platform tapers forwardly and is provided with downturned side and rear flanges 9 and 10 respectively which not only conceal the supporting frame but present edges of substantial vertical width.

The battery housing 11 is provided with laterally projecting flanges 12 secured to the platform by means of the conventionally illustrated fasteners 13. The battery is indicated by dotted lines at 14 in FIGS. 1 and 2. A supporting yoke 15 for the driving wheel 16 is provided with an upwardly projecting tubular spindle 17 mounted in the bearing 7, the yoke being provided with a thrust collar 18 at its lower end and with a retaining collar 19 at its upper end.

The manually manipulated steering shaft 20 is provided with a handle bar 21 at its upper end, the handle bar having grips 22 thereon. This handle bar is telescopingly engaged with and is detachably secured to the yoke spindle 17 by the threaded members 23 which are threaded into the collar 19 and are engageable with the holes or bores 24 in the steering shaft, see FIG. 5. This permits the steering shaft being removed for storage or shipment.

In the embodiment illustrated the yoke 15 is provided with forwardly projecting lower portions having horizontal slots 25 therein adapted to adjustably receive the axle 26 the purpose of this adjustment being to permit proper tensioning of the driving connections to the driving wheel.

The motor, designated generally by the numeral 27, is mounted on the yoke 15 as are also the driving connections for the motor to the steering wheel 16. In the embodiment illustrated, the motor supporting brackets 28 and 29 are fixedly mounted to the arms of the yoke, the bracket 29 having an offset therein as shown in FIG. 6 to accommodate the length of the motor which is disposed between the ends of the brackets and secured thereto by the screws or bolts 30, which are conventionally shown. The front ends of these brackets are recessed at 31 to receive portions of the ends of the motor and have holes 32 therein to receive the attaching screws or bolts, see FIG. 7. Mounted on the inner end of the arm or bracket 28 is a bearing 33 for the shaft 34 which is provided with a gear 35 on its outer end and a gear 36 on its inner end. The gear 35 is connected to the gear 37 on the shaft 38 of the motor by the sprocket chain 39, see FIGS. 2 and 6. The gear 36 on the inner end of the shaft 34 is connected to the gear 40 secured to the side of the driving wheel 6 at 41 by means of the sprocket chain 42. These gears and the sprocket chains are conventionally illustrated but gear and sprocket chain driving connections to the motor are highly desirable as there can be no slippage in the driving connections.

As stated, the shaft 26 of the driving wheel is desirably adjustably mounted on the forwardly projecting ends of the yoke to take up slack in the sprocket chain 46, although it will be understood that other means might be provided for that purpose.

In FIG. 9 the motor 27 and the battery 14 are conventionally illustrated. The motor control switch 47 is conventionally illustrated in FIG. 9, and in FIG. 5, and is mounted on the bracket 48 extending between the arms of the yoke 8. The switch member 49 is conventionally illustrated in FIG. 5 and projects upwardly in alignment with the switch actuating rod 50 which is disposed in the steering shaft 20 and provided with a fingerpiece 51 projecting above the handpiece 21. The lower end of this rod projects through a guide 52 in alignment with the switch closing member 49. The switch member 49 is automatically retracted to open position when the push rod is released, the spring conventionally illustrated in FIG. 5 acting to that end.

The electrical connections for the battery to the motor are conventionally illustrated at 55 and the relationship of the switch thereto is indicated in FIG. 5. The housing for the motor and driving gear is highly desirable as it not only protects the motor and the gearing, but it prevents parts from becoming entangled therewith. It is open at the rear end and its top is slotted at 58 to receive the bearing member 7 and is secured by the screws 59 so that it can be easily removed should occasion require, the bight of the yoke being provided with holes 60 to receive these screws, see FIG. 2.

In the embodiment of our invention illustrated, the platform 8 is provided with a series of anti-slip elements 56 conventionally shown and with a transversely disposed reinforcing member 57 disposed on the platform at the rear of the battery housing. It has been pointed out that the steering shaft 20 is detachably secured to the yoke spindle 17 by the threaded members 23. These members 23 also serve as stop members limiting the pivotal or rotatable movement of the handle shaft 20 by engagement with the stop member 61. This provides a wide range of steering adjustment while maintaining the handle in operative relation to the deck or platform. It is sometimes desirable to remove the steering shaft and the steering wheel and parts mounted theron for convenience in packaging or storage. With these parts assembled and connected as described they may be very quickly removed and very quickly assembled. The arrangement of the control means as described including the switch actuating or control rod 50 permits ready assembly and disassembly.

As stated, our improved vehicle is designed primarily for use in office buildings, factories, warehouses and the like where individuals are required to visit portions of a building which are substantially spaced or in traveling between buildings. It is, however, desirable for use in traveling on pavements and walks and the like. The structure is very compact and the weight of the user upon the traction and steering wheels serves to stabilize and provide effective engagement with the surface over which the vehicle is traveling.

We have illustrated and described our invention in a highly practical embodiment thereof. We have not attempted to illustrate or describe various adaptations and modifications as it is believed this disclosure will enable those skilled in the art to embody or adapt our invention as may be desired.

Having thus described the invention, what is claimed as new and desired to secure by Letters Patent is:

1. A motor vehicle comprising a platform adapted to receive an operator in standing position and provided with rear wheels and having upwardly projecting arms at its front end provided with a rearwardly inclined bearing, a steering and driving wheel yoke rotatably mounted in said bearing, a tubular steering shaft removably connected to said yoke and projecting upwardly from said bearing and provided with a handle at its upper end, a driving and steering wheel mounted on said yoke, a motor mounted on said yoke, speed reducing driving connections for said motor to said steering and driving wheel mounted on said yoke, a battery mounted on said platform, electric connections for said battery to said motor including an automatically opening switch disposed between and supportedly mounted on the arms of said yoke in downwardly spaced relation to their upper ends, a reciprocatingly mounted switch closing rod disposed longitudinally within said steering shaft and provided with a fingerpiece at its upper end disposed adjacent said handle, the lower end of said rod being in alignment with the switch closing member of said switch, a spring supporting bracket mounted on said yoke and through which said rod projects, a rod retracting spring mounted on said bracket, and a housing for said motor, said switch and said rod retracting spring mounted on said yoke.

2. A motor vehicle comprising a platform adapted to receive an operator in standing position and provided with rear wheels and having upwardly projecting arms at its front end provided with a rearwardly inclined bearing, a steering and driving wheel yoke rotatably mounted in said bearing, a tubular steering shaft operatively connected to said yoke and projecting upwardly from said bearing and provided with a handle at its upper end positioned to be grasped by an opertor standing on said platform, a driving and steering wheel mounted on said yoke, a motor mounted on said yoke, speed reducing driving connections for said motor to said steering and driving wheel mounted on said yoke, a battery mounted on said platform, electric connections for said battery to said motor including an automatically opening switch disposed between and supportedly mounted on the arms of said yoke in downwardly spaced relation to their upper ends, and a spring retracted reciprocatingly mounted switch closing rod disposed longitudinally of said steering shaft and provided with a fingerpiece at its upper end disposed adjacent said handle.

3. A motor vehicle comprising a body provided with rear wheels and having upwardly and forwardly converging arms at its front end, a rearwardly inclined steering and driving wheel yoke spindle bearing member fixedly mounted on said arms, a steering and driving wheel yoke provided with a spindle rotatably mounted in said bearing member, a steering and driving wheel mounted on said yoke, an electric motor mounted on said yoke and having driving connection to said steering and driving wheel, a steering shaft telescopingly engaged with said yoke spindle and provided with a handle, a collar disposed on the upwardly projecting end of said yoke spindle in bearing engagement with the upper end of said yoke spindle bearing member, coupling pins having threaded engagement with said thrust bearing member, said shaft and said spindle having alignable holes therein adapted to receive the inner ends of said coupling pins, said coupling pins being adjustable to connect said steering shaft to said spindle or to be retractably adjusted to permit removal of said steering shaft from said spindle while retaining said spindle in said bearing and to be further retractably adjusted to permit removal of said spindle from said bearing member.

4. A motor vehicle comprising a body provided with rear wheels and having a vertically disposed steering and driving wheel yoke spindle bearing member at its front end, a steering and driving wheel yoke provided with a spindle rotatably mounted in said bearing member, a steering and driving wheel mounted on said yoke, an electric motor mounted on said yoke and having driving connection to said steering and driving wheel, a steering shaft telescopingly engaged with said yoke spindle, a collar disposed on the upwardly projecting end of said yoke spindle in bearing engagement with the upper end of said yoke spindle bearing member, coupling pins having threaded engagement with said thrust bearing member and having outer portions projecting therefrom and constituting stop members, said shaft and said spindle having alignable holes therein adapted to receive the inner ends of said coupling pins, said coupling pins being adjustable to connect said steering shaft to said spindle or to be retractably adjusted to permit removal of said steering shaft from said spindle while retaining said spindle in said bearing and to be further retractably adjusted to permit removal of said spindle from said bearing member, and a stop disposed on said spindle bearing member and with which said coupling pins coact when they are in retaining engagement with said yoke spindle and steering shaft and limiting rotative movement of said steering shaft.

5. A motor vehicle comprising a body provided with rear wheels and having a vertically disposed steering and driving wheel yoke spindle bearing member at its front end, a steering and driving wheel yoke provided with a spindle rotatably mounted in said bearing member, a steering and driving wheel mounted on said yoke, an electric motor mounted on said yoke and having driving connection to said steering and driving wheel, a steering shaft telescopingly engaged with said yoke spindle, a thrust bearing member disposed on the upwardly projecting end of said yoke spindle in bearing engagement with the upper end of said yoke spindle bearing member, coupling pins having threaded engagement with said thrust bearing member, said shaft and said spindle having alignable holes therein adapted to receive the inner ends of said coupling pins, said coupling pins being adjustable to connect said steering shaft to said spindle or to be retractably adjusted to permit removal of said steering shaft from said spindle while retaining said spindle in said bearing and to be further retractably adjusted to permit removal of said spindle from said bearing member.

6. A motor vehicle comprising a platform adapted to receive an operator in standing position and provided with rear wheels and with an upwardly projecting arm at its front end provided with an upright rearwardly inclined bearing, a battery supportedly mounted at the front end of said platform and rearwardly of said upwardly projecting arm, a steering and driving wheel yoke rotatably mounted in said bearing and projecting downwardly therefrom in forwardly spaced relation to said platform, a steering shaft connected to said yoke projecting upwardly from said bearing in overhanging relation to said battery and provided with a handle at its upper end disposed to be grasped by an operator standing on said platform rearwardly of said battery, a driving and steering wheel mounted on said yoke, a motor supportedly mounted on said yoke, driving connections for said motor to said driving and steering wheel supportedly mounted on said yoke, electric connections for said battery to said motor including an automatically opening switch supportedly mounted on said yoke, and closing means for said automatically opening switch including a fingerpiece disposed adjacent said handle for manipulation by an operator positioned on the platform to grasp the handle.

7. A motor vehicle comprising a platform adapted to receive an operator in standing position and provided with rear wheels and with an upwardly projecting fixed arm at its front end provided with a vertically disposed bearing, a battery supportedly mounted at the front end of said platform and rearwardly of said vertically disposed arm, a steering and driving wheel yoke rotatably mounted in said bearing and projecting downwardly therefrom in forwardly spaced relation to said platform, a steering shaft connected to said yoke projecting upwardly from said bearing and provided with a handle at its upper end disposed to be grasped by an operator standing on said platform rearwardly of said battery, a driving and steering wheel mounted on said yoke, a motor disposed forwardly of and supportedly mounted on said yoke above said steering and driving wheel, driving connections for said motor to said driving and steering wheel supportedly mounted on said yoke, electric connections for said battery to said motor including an automatically opening switch supportedly connected to said yoke, and closing means for said automatically opening switch including a manually operable member disposed adjacent said handle for manipulation by an operator positioned on the platform to grasp the handle.

8. A motor vehicle comprising a platform adapted to receive an operator in standing position and provided with rear wheels and having upwardly projecting arms at its front end provided with a rearwardly inclined bearing, a steering and driving wheel yoke rotatably mounted in said bearing, a steering shaft operatively connected to said yoke and projecting upwardly from said bearing and provided with a handle at its upper end positioned to be manipulated by an operator in standing position on said platform, a driving and steering wheel mounted on said yoke, a motor mounted on said yoke, driving connections for said motor to said steering and driving wheel mounted on said yoke, a battery mounted on said platform, electric connections for said battery to said motor including an automatically opening switch supportedly mounted on said yoke, and a switch closing rod mounted on said steering shaft operatively associated with said switch and provided with a fingerpiece at its upper end disposed adjacent said handle.

9. A motor vehicle comprising a platform adapted to receive an operator in standing position and provided with rear wheels and having an upwardly projecting arm at its front end provided with an upright bearing, a steering and driving wheel yoke mounted on and projecting downwardly and forwardly from said bearing, a steering shaft nonrotatably and operatively connected to said yoke and projecting upwardly and rearwardly from said bearing and provided with a handle at its upper end positioned to be manipulated by an operator in standing position on said platform and constituting a support for the operator standing on the platform, a driving and steering wheel mounted on said yoke, a battery mounted on said platform below said handle, electric connections for said battery to said motor including an automatically opening switch supportedly mounted on said yoke, and a switch closing rod mounted on said shaft and operatively associated with said switch and provided with a handpiece at its upper end disposed manipulatingly adjacent said handle.

10. A motor vehicle comprising a platform adapted to receive an operator in standing position and provided with rear wheels and having an upwardly projecting arm at its front end provided with an upright bearing, a steering and driving wheel yoke mounted on and projecting downwardly and forwardly from said bearing, a steering shaft nonrotatably and operatively connected to said yoke and projecting upwardly and rearwardly from said bearing and provided with a handle at its upper end positioned to be manipulated by an operator in standing position on said platform and constituting a support for the operator standing on the platform, a driving and steering wheel mounted on said yoke, a battery mounted on said platform below said handle, electric connections for said battery to said motor including an automatically opening switch supportedly mounted on said yoke, and a switch closing means operatively associated with said switch and provided with a handpiece disposed adjacent said handle to be manipulated by an operator on said platform when in handle grasping position.

References Cited in the file of this patent

UNITED STATES PATENTS

| | | |
|---|---|---|
| 1,832,018 | Gossard | Nov. 17, 1931 |
| 2,222,904 | Heaslet | Nov. 26, 1940 |
| 2,495,573 | Duke | Jan. 24, 1950 |
| 2,504,403 | Finley | Apr. 18, 1950 |
| 2,567,065 | Ginsterblum | Sept. 4, 1951 |
| 2,635,703 | Goeller | Apr. 21, 1953 |
| 2,656,197 | Leber | Oct. 20, 1953 |
| 2,706,008 | Voigt | Apr. 12, 1955 |
| 2,771,145 | Peters | Nov. 20, 1956 |
| 2,879,858 | Thomas | Mar. 31, 1959 |

FOREIGN PATENTS

| | | |
|---|---|---|
| 467,304 | France | Mar. 27, 1914 |